United States Patent
McVicar et al.

(10) Patent No.: US 11,352,052 B2
(45) Date of Patent: Jun. 7, 2022

(54) HYDRAULIC STEERING SYSTEMS FOR VEHICLE WHEELS

(71) Applicant: Combilift, County Monaghan (IE)

(72) Inventors: Martin McVicar, County Monaghan (IE); Robert Moffett, County Monaghan (IE); Mark Whyte, County Monaghan (IE)

(73) Assignee: COMBILIFT, County Monaghan (IE)

( * ) Notice: Subject to any disclaimer, the term of this patent is extended or adjusted under 35 U.S.C. 154(b) by 0 days.

(21) Appl. No.: 16/978,309

(22) PCT Filed: Jan. 18, 2019

(86) PCT No.: PCT/EP2019/051235
§ 371 (c)(1),
(2) Date: Sep. 4, 2020

(87) PCT Pub. No.: WO2019/170310
PCT Pub. Date: Sep. 12, 2019

(65) Prior Publication Data
US 2021/0001920 A1  Jan. 7, 2021

(30) Foreign Application Priority Data
Mar. 6, 2018 (GB) ...................................... 1803601

(51) Int. Cl.
*B62D 5/12* (2006.01)
*B62D 7/02* (2006.01)
(Continued)

(52) U.S. Cl.
CPC ................. *B62D 5/12* (2013.01); *B62D 5/26* (2013.01); *B62D 7/026* (2013.01); *B62D 7/1509* (2013.01); *B62D 7/1536* (2013.01)

(58) Field of Classification Search
CPC ... B62D 5/12; B62D 5/26; B62D 5/28; B62D 7/02; B62D 7/026; B62D 7/10; B62D 7/1509; B62D 7/1536
(Continued)

(56) References Cited

U.S. PATENT DOCUMENTS 3,075,784 A * 1/1963 Beyerstedt ........... B62D 7/1509
  180/414
3,446,307 A * 5/1969 Logus .................. B62D 7/1509
  180/414
(Continued)

FOREIGN PATENT DOCUMENTS

| FR | 2694535 | 2/1994 |
| JP | 2000327295 | 11/2000 |
| WO | 2014/075921 | 5/2014 |

OTHER PUBLICATIONS

International Search Report issued in international application No. PCT/EP2019/051235 dated May 13, 2019.

*Primary Examiner* — Minnah L Seoh
*Assistant Examiner* — Hosam Shabara
(74) *Attorney, Agent, or Firm* — Whiteford, Taylor & Preston, LLP; Gregory M. Stone (57) ABSTRACT

A steering system (10) for a vehicle wheel (12) has a wheel carrier (14) for mounting a steered wheel (12), the wheel carrier (14) being rotatably mounted with respect to the vehicle about a steering axis to allow the wheel (12) to be steered. A hydraulic cylinder (20) has a piston therein and a rigid connecting rod assembly (22) extending from the piston out of the cylinder (20). The rigid connecting rod assembly (22) comprises a first section (22) adapted to reciprocate into and out of the cylinder (20) and a second section (26) rigidly extending from the first section (22) to a pivot point connection (50) where it is pivotally connected to the wheel carrier (14) at an offset from the steering axis.

(Continued)

The hydraulic cylinder (20) is pivotally mounted on the vehicle such that it is prevented from translational movement relative to the vehicle but capable of changing its orientation with respect to the vehicle. Due to the rigid connecting rod assembly (22) and the pivot connection to the wheel carrier (14), as well as the pivotal mounting of the cylinder (20) on the vehicle, lateral strains on the seals of the hydraulic cylinder (20) are avoided.

13 Claims, 7 Drawing Sheets (51) Int. Cl.
   *B62D 7/15* (2006.01)
   *B62D 5/26* (2006.01)

(58) Field of Classification Search
   USPC .................................. 180/439, 417, 253, 254
   See application file for complete search history.

(56) References Cited

U.S. PATENT DOCUMENTS

| | | | |
|---|---|---|---|
| 4,498,554 A | | 2/1985 | Young et al. |
| 4,718,686 A | * | 1/1988 | Dziuba .................... B62D 5/12 |
| | | | 180/435 |
| 8,353,377 B2 | * | 1/2013 | Geiger .................... B60B 35/10 |
| | | | 180/209 |
| 10,421,484 B2 | * | 9/2019 | Fay, II .................... B62D 9/00 |
| 2007/0240928 A1 | * | 10/2007 | Coltson .................... E02F 3/283 |
| | | | 180/411 |
| 2011/0079977 A1 | | 4/2011 | Geiger et al. |

\* cited by examiner

HYDRAULIC STEERING SYSTEMS FOR VEHICLE WHEELS

TECHNICAL FIELD

This invention relates to hydraulic steering systems for vehicle wheels, and to vehicles equipped with such systems.

BACKGROUND ART

Hydraulic steering systems are commonly used in vehicles such as forklift trucks. Typically, a hydraulic cylinder controls the rotation of a wheel carrier about a generally vertical steering axis. The extension or retraction of the cylinder's connecting rod pushes or pulls an offset point on the wheel carrier and causes the carrier to rotate about the steering axis, thereby steering a wheel mounted on the carrier.

An example of such a steering system is disclosed in WO 2014/075921. A pair of steerable wheels are disclosed, each controlled by a hydraulic cylinder, with the cylinders being connected in series such that they operate in synchronicity on their respective wheels. Each hydraulic cylinder is immovably mounted to the vehicle chassis and has an active connecting rod that is capable of reciprocating movement in conventional manner. A steering lever acts as a linkage between the free (distal) end of the connecting rod and the wheel carrier, with the steering lever being pivotally linked to both the connecting rod and the wheel carrier. The immovable mounting of the cylinder allows rigid hydraulic lines (e.g. metal pipes) to be connected to the cylinder in place of conventional flexible lines.

A drawback with such a system is that the force vector acting through the steering lever varies in direction throughout the range of steering angles. At some points in the steering cycle, the force vector is directed at an angle towards the connecting rod where it has a significant lateral component. This places a strain on the cylinder seals and may lead to a failure of the hydraulic sealing. It also necessitates a larger and stronger connecting rod to withstand the buckling forces, and strengthened seals for the connecting rod on the cylinder. Because the cylinders are hydraulically linked, a passive connecting rod extends from the rear of each hydraulic cylinder to seal the chamber behind the piston, and the lateral forces are also transmitted to the passive connecting rod and the seals at the rear of the cylinder. Furthermore, the alleged advantage of rigid hydraulic lines over flexible ones is not necessarily present. Rigid hydraulic lines are more expensive to make, more expensive to replace, and can be less reliable especially on mobile equipment due to vibration.

DISCLOSURE OF THE INVENTION

The invention provides a steering system for a vehicle wheel, comprising:
- a wheel carrier for mounting a steered wheel, the wheel carrier being rotatably mounted with respect to the vehicle about a steering axis to allow the wheel to be steered;
- a hydraulic cylinder having a piston therein and a rigid connecting rod assembly extending from the piston out of the cylinder;
- wherein the rigid connecting rod assembly comprises a first section adapted to reciprocate into and out of the cylinder and a second section rigidly extending from the first section to a pivot point connection where it is pivotally connected to the wheel carrier at an offset from the steering axis; and
- wherein the hydraulic cylinder is pivotally mounted on the vehicle such that it is prevented from translational movement relative to the vehicle but capable of changing its orientation with respect to the vehicle.

By providing a pivotally mounted hydraulic cylinder with a rigid connecting rod assembly that extends directly to the pivot point on the wheel carrier, the use of a doubly pivoted steering lever or linkage is avoided. The hydraulic cylinder can change its orientation to accommodate the angular change in position of the pivot point on the wheel carrier. In this way, lateral buckling forces are minimized.

While the steering system is hydraulic, it can be used in vehicles having any kind of drive system (in other words not only in hydraulic drive vehicles). Thus, for example it can be used in hydraulic drive trucks, vehicles with internal combustion engines, hybrid vehicles, electrical vehicles and so on.

Preferably, said first section is a straight linear rod section and said pivot point is disposed in linear alignment with the first section.

In this way, the force vector from the pivot point is assured to be directed along the line of the straight linear connecting rod section and along the axis of the hydraulic cylinder itself, thereby completely eliminating any additional lateral strain on the seals of the cylinder.

Further, preferably, said pivot point, the point at which the second and first sections are rigidly coupled, the axis of the first section, the axis of the cylinder, and the position at which the cylinder is pivotally mounted on the vehicle, are all collinear.

Preferably, the second section is a curved member extending between the first section and the pivot point connection, the curved member defining a concavity which may accommodate a portion of the wheel carrier.

This concavity can extend the range of steering angles by allowing the pivot point to be driven "around" a part of the wheel carrier, such as a hub or bearing.

Preferably, the concavity accommodates a portion of the wheel carrier when the steering angle is at a maximum in one direction.

Preferably, said second section is an arcuate member.

The connecting rod assembly can be an integrally formed structure having said first and second sections. (In other words, the term "assembly" does not imply that the first and second sections must be separate entities connected together, as an integrally formed member can be fabricated to include both sections.)

In currently preferred embodiments, the connecting rod assembly comprises a connecting rod as said first member and an extension member rigidly affixed to the connecting rod as said second member.

The rigid affixing of the extension member to the connecting rod excludes the use of a pivoting connection at this point.

The steering system preferably further comprises a passive rod extending from the cylinder in the opposite direction to the connecting rod and mounted on a common piston or piston assembly therewith, the passive rod sealing the cylinder in the direction away from the wheel and permitting synchronization of the cylinder with another hydraulic cylinder in a push-pull arrangement.

Such a passive rod may be omitted if synchronization is not required, or if an alternative method of synchronization is to be employed.

The system may also include a wheel mounted on said wheel carrier.

Preferably, the system further comprises a hydraulic circuit including a hydraulic pump, a connection from the hydraulic pump to the hydraulic cylinder, and means for controlling the flow of hydraulic fluid within the hydraulic circuit in response to a steering input.

In another aspect there is provided a vehicle steering system comprising a first steering system for a first vehicle wheel according to any of claims 1-9, a second steering system for a second vehicle wheel according to any of claims 1-9, and a hydraulic circuit connecting the hydraulic cylinders of the first and second steering systems in series.

There is also provide a vehicle comprising a steering system according to any of claims 1-10.

BRIEF DESCRIPTION OF THE DRAWINGS

The invention will now be illustrated by the following description of embodiments thereof, given by way of example only, with reference to the accompanying drawings, in which.

DETAILED DESCRIPTION OF PREFERRED EMBODIMENTS

Figure 1:
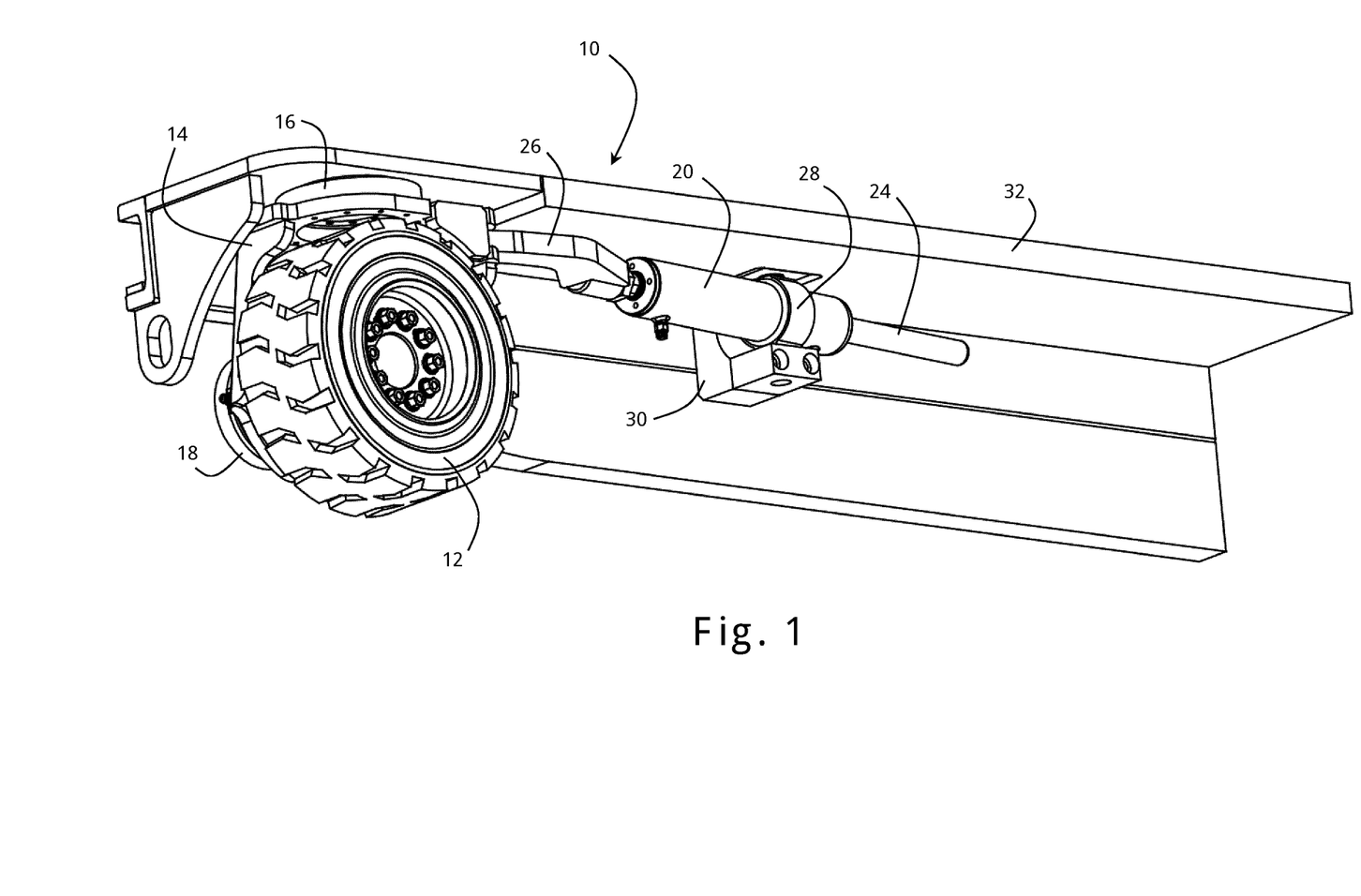
FIGS. 1-3 are perspective views of a steering system for a vehicle wheel, depicted at different steering angles.
Figure 2:
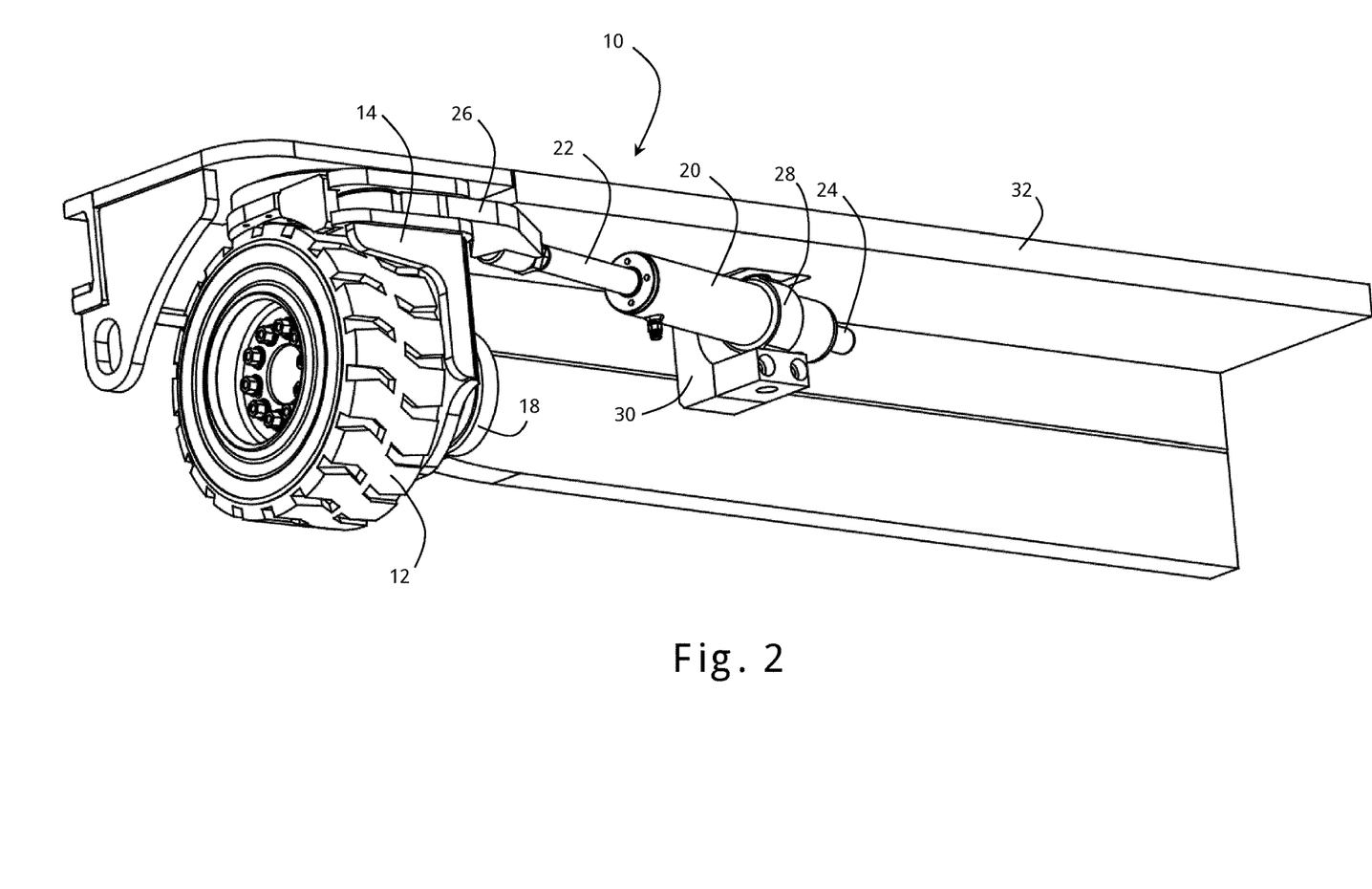
Figure 3:
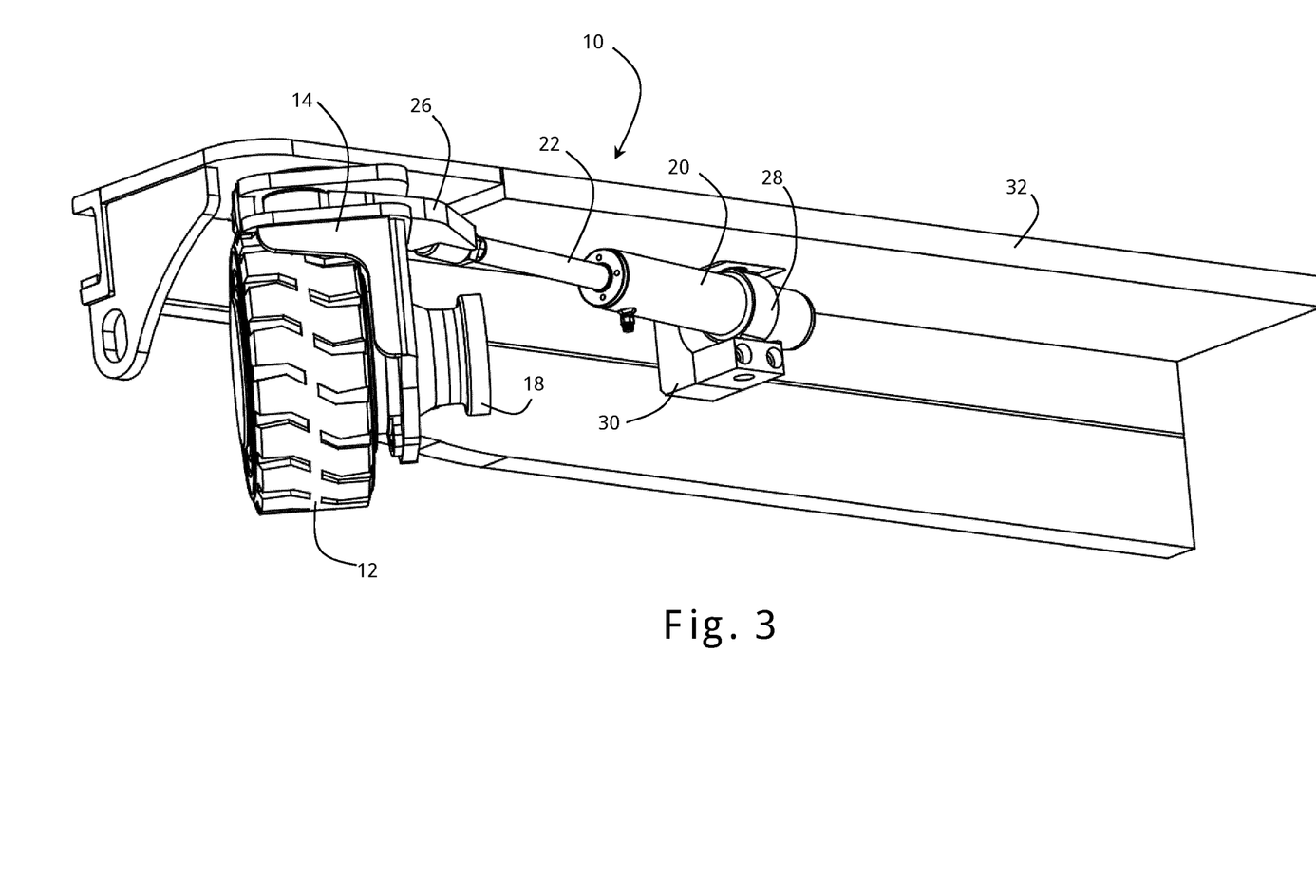

Referring to FIGS. 1-3, a steering system 10 for a vehicle wheel 12 is shown in perspective view.

FIG. 1 shows the system when the wheel 12 is steered straight ahead. FIG. 2 shows the system when the wheel 12 is steered at right angles, i.e. having been turned 90° to steer in a sideward direction. FIG. 3 shows the system when the wheel 12 is steered to its maximum extent, beyond 90°, to a steering angle of approximately 135°.

The wheel 12 is mounted on a wheel carrier 14 which in turn is mounted on a bearing or hub 16 which permits the wheel to be rotated about a vertical axis relative to the chassis 32 of a vehicle. A drive motor 18, which may for example be hydraulic or electric, is mounted on the wheel 12 permitting the wheel to be driven in a forward or a reverse direction. It will be appreciated that the nature of the vehicle drive system, and the coupling of the drive system to the wheel, is not essential to the steering system and can be varied according to the preferences of the designer or manufacturer. So, for example, instead of a hydraulic or electric motor mounted on the wheel, an engine could be coupled to the wheel using a drive shaft or a gearing assembly. The engine could be internal combustion, hybrid, electrical, hydraulic or of any other kind.

Steering of the wheel is controlled by a hydraulic cylinder 20 which has an active connecting rod 22 (FIGS. 2 and 3, hidden in FIG. 1) and a passive rod 24. The connecting rod 22 constitutes a first section of a rigid connecting rod assembly, and is adapted to reciprocate into and out of the cylinder.

FIG. 1 shows the system when the connecting rod is withdrawn fully into the cylinder 20, FIG. 2 shows the connecting rod 22 having been driven out partway from the cylinder, and FIG. 3 shows the connecting rod at its maximum extension from the cylinder.

A second section 26 of the rigid connecting rod assembly is provided in the form of a rigid steel plate which is rigidly coupled (i.e. with no freedom of movement, rotation or pivoting) to the connecting rod 22. Thus, as the connecting rod 22 is reciprocated into and out of the cylinder 20, the second section is driven correspondingly towards and away from the cylinder in a straight line.

The passive rod 24 is uncoupled at its free end and serves to allow the cylinder to be hydraulically coupled to and synchronized with a cylinder of a steering system for another wheel in a push-pull manner described further below. This passive rod could be dispensed with if such synchronization is not required, or could be substituted by an alternative synchronization mechanism such as a separate synchronizing cylinder or by appropriate hydraulic pumping circuits driving a steering mechanism on another wheel.

A priming valve (not shown) is provided in the piston. As is known in the art, such a priming valve is useful for priming the system on initial start-up and for keeping the cylinders primed and synchronized in use in a multi-cylinder system such as is described in relation to FIGS. 7-10.

The hydraulic cylinder is pivotally mounted on the vehicle such that it is prevented from translational movement relative to the vehicle but capable of changing its orientation with respect to the vehicle. The pivot mount is provided by a collar 28 affixed to the outside of the cylinder, with the collar being trunnion mounted in a fixed bracket 30 that is welded to the vehicle chassis 32.

Figure 4:
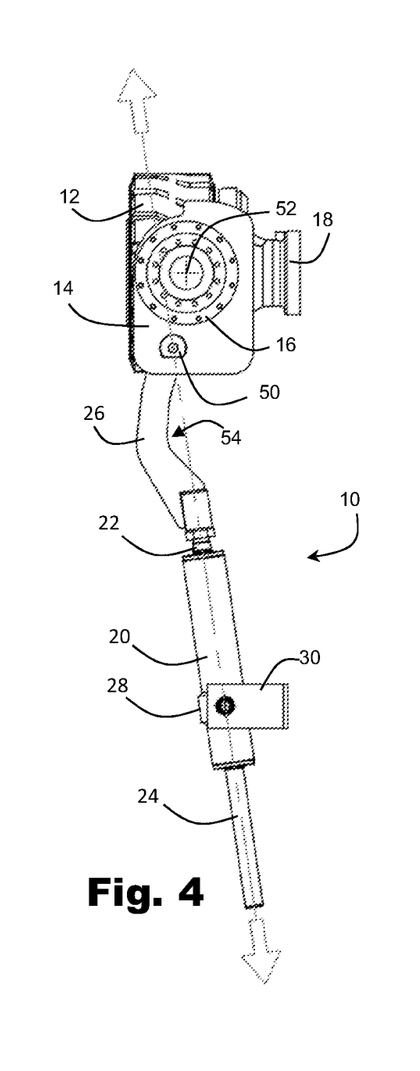
FIGS. 4-6 are plan views of the steering system, depicted at the same steering angles as FIGS. 1-3, respectively.
Figure 5:
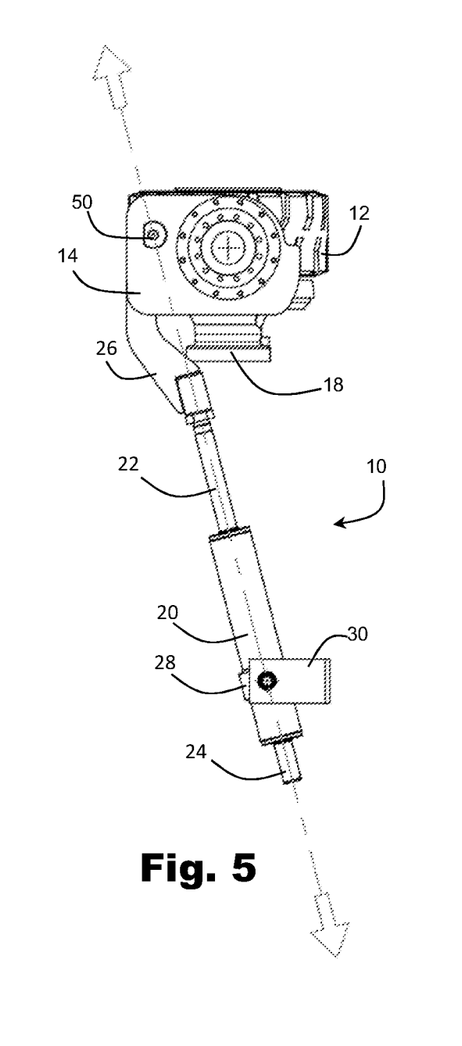
Figure 6:
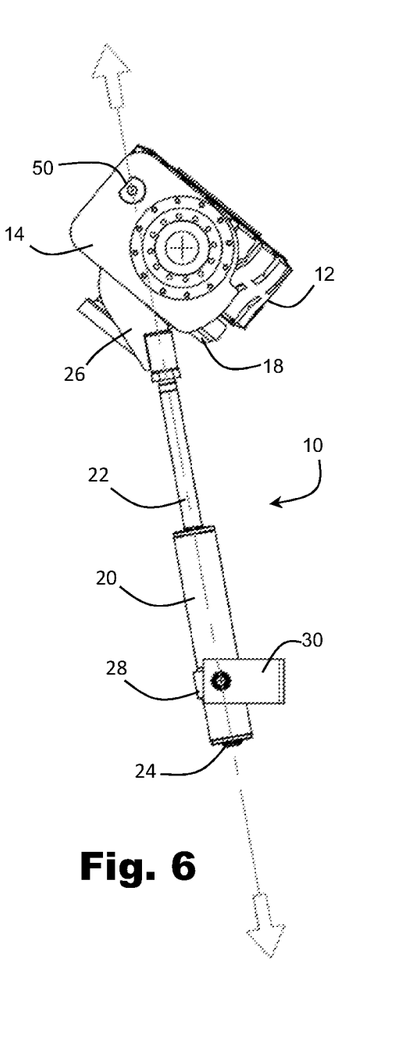

Referring additionally to FIGS. 4-6, the operation of the steering system for a vehicle wheel is shown in plan view.

It can be seen, moving from FIG. 4 to FIG. 5 to FIG. 6, that the rigid connecting rod assembly is progressively pushed away from the cylinder. The second section 26, being rigidly mounted on the first section (connecting rod 22), maintains its angular disposition and is linearly translated away from the cylinder 20.

The distal end of the second section 26 (i.e. the end remote from the cylinder) is pivotally coupled to the wheel carrier 14 at a pivot point 50. As this pivot point 50 is offset from the centre of rotation 52 of the bearing 16, it translates laterally relative to the cylinder 20 as the connecting rod is extended. Due to the pivot mounting of the cylinder 20 on the chassis, the cylinder orientation changes as the connecting rod extends, as can be seen in the progression from FIG. 4 to FIG. 6.

The lack of lateral movement between the cylinder 20, the first section and the second section 26, eliminates strains on the cylinder seals. Furthermore, it can be observed that all points of the steering cycle, the pivot point 50, the point at which the second section 26 and first section are rigidly coupled, the axis of the first section, the axis of the cylinder 20, and the position at which the cylinder is pivotally mounted on the vehicle (i.e. the pivot between collar 28 and bracket 30), are all collinear. The force vectors (indicated by the broad arrows in FIGS. 4-6 are all directed along this collinear axis, ensuring that there are never any lateral forces on the cylinder or connecting rods 22, 24.

The second section 26 is in the form of a curved member extending between the first section and the pivot point connection 50. The curved member defines a concavity 54 which may accommodate a portion of the wheel carrier. This can be seen in FIG. 6 where the concavity 54 accommodates part of the wheel carrier below the hub as the steering angle extends beyond 90° to its maximum angle (in this embodiment) of 135°. Thus, the arcuate shape of the second section 26 transmits the forces from the pivot point in a straight line passing through a part of the hub.

Depending on the shapes and dimensions chosen, the maximum steering angle may be more or less than 135°, according to the wishes of the designer. The second member could be mounted above the wheel carrier and accommodate part of the hub or bearing 16 in an alternative arrangement.

In the illustrated embodiment, the connecting rod 22 is fitted into and rigidly affixed (such a by welding) within a socket formed in the proximal end of the second section. However other rigid mounting arrangements can be employed also. Furthermore, the use of the term "assembly" (as in the rigid connecting rod assembly) does not imply that the first and second sections must be separate members that are assembled together. The rigid connecting rod assembly could be an integrally formed component with identifiable portions including a first portion or section adapted to reciprocate within the cylinder and a second portion or section extending from the first portion to the wheel carrier.

The steering system for a vehicle wheel shown in FIGS. 1-6 can be incorporated in an overall steering system for a vehicle, as shown in FIGS. 7-10. The vehicle in question is a forklift truck but the steering system can be implemented in any vehicle for which hydraulic steering is suitable.

Figure 7:
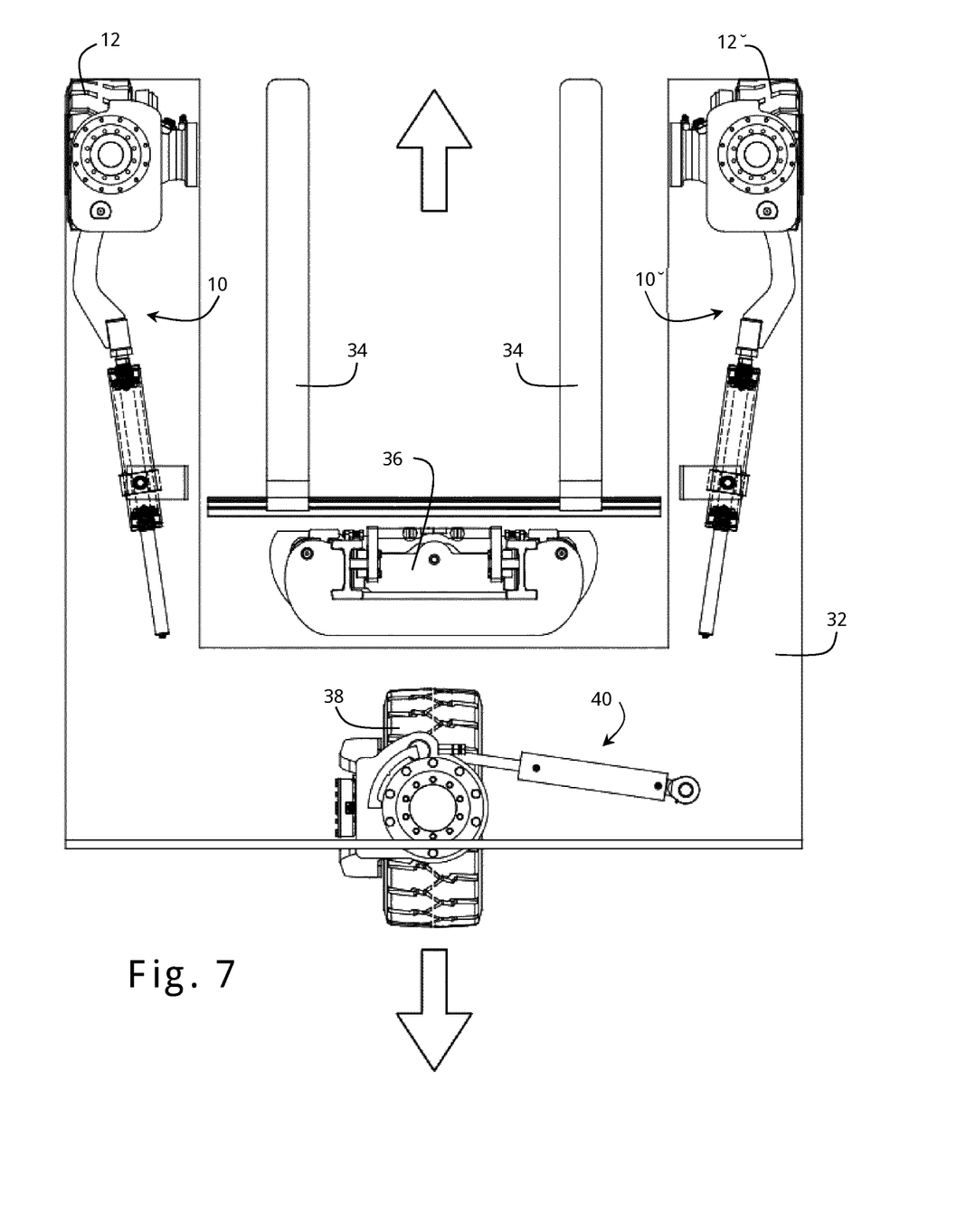
FIG. 7 is a plan view of a vehicle equipped with a vehicle steering system, depicted in a normal steering mode.

Referring first to FIG. 7, a forklift truck is shown in plan view. The view of the vehicle is simplified to show the chassis 32, the forks 34, the fork-lifting mechanism 36, and the wheels and steering arrangement, which will now be described.

A left front wheel 12 and steering system 10, exactly as previously described in relation to FIGS. 1-6, is mounted at the front left side. A right front wheel 12' is controlled by a steering system 10' which is a mirror image of the steering system 10. At the rear of the vehicle a steerable, driven rear wheel is mounted with its own (conventional) steering cylinder 40. However, the conventional steering cylinder could be replaced with a steering system for a vehicle wheel according to the invention.

The vehicle is shown in FIG. 7 in normal steering mode. All three wheels 12, 12', 38 are aligned with the front-rear axis of the vehicle, i.e. aligned parallel with the forks 34. In this steering mode, the steering systems 10, 10' may be inactive with the front wheels fixed, and the vehicle can be steered by the rear wheel alone, i.e. withdrawing or extending the rod from cylinder 40 to rotate the rear wheel 38 about its vertical axis.

Figure 8:
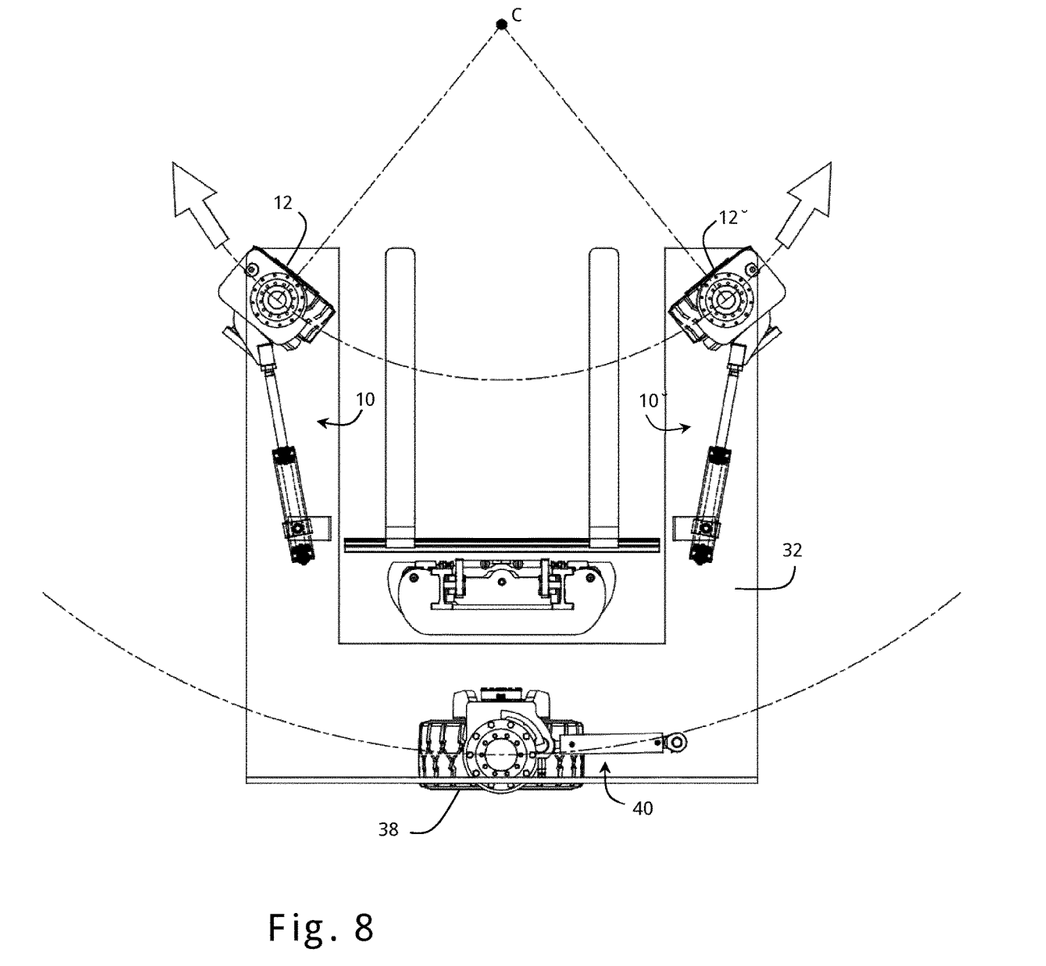
FIG. 8 is a plan view of the vehicle of FIG. 7, depicted in a sideways steering mode.

In FIG. 8 the vehicle is shown in sideward mode. The rear wheel 38 has been turned through 90° to be aligned perpendicular to the front-rear axis of the vehicle, so that the vehicle can be driven sideways and steered using the front wheels 12, 12'. In this mode, the rear wheel 38 is fixed in position and follows an arc whose direction of curvature and radius are determined by the angle of the front wheels 12, 12'.

The respective cylinders of the steering systems 10, 10' of each front wheel are synchronized so that, as shown in FIG. 8, the angle adopted by left front wheel 12 is mirrored by wheel 12' in the opposite direction. Thus, the two steering systems for a vehicle wheel together form part of an overall vehicle steering system, which is shown in FIGS. 9 and 10.

Figure 9:
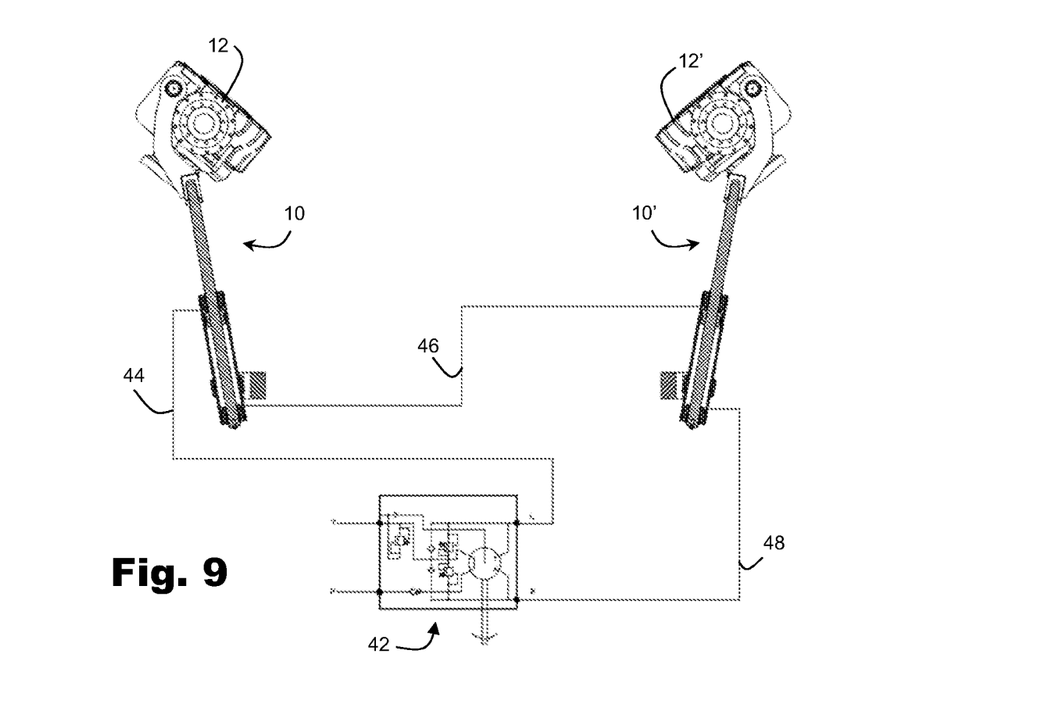
FIG. 9 is an overall hydraulic circuit for the vehicle steering system used in the vehicle of FIGS. 7 and 8 in sideways steering mode.

In FIG. 9 it can be seen that the cylinder of left-hand system 10 is coupled to the cylinder of right-hand system 10' by a hydraulic circuit which comprises a control circuit 42, a left-hand pressure line 44 leading to/from port L of the control circuit, a bridging line 46, and a right-hand pressure line 48 leading to/from port R. Each cylinder has a front chamber (with the connecting rod 22, see FIGS. 1-6) and a rear chamber (with the passive rod 24), the chambers being filled with hydraulic fluid and separated by the piston on which the rods are mounted.

The front chamber of system 10 is connected to left-hand pressure line 44. The rear chamber of system 10 is connected to the front chamber of system 10' by the bridging line 46. The rear chamber of system 10' is connected to right-hand pressure line 48. The cylinder volumes are equal and the system is balanced so that, as shown in FIG. 9, both pistons adopt the same position along their respective cylinders.

Figure 10:
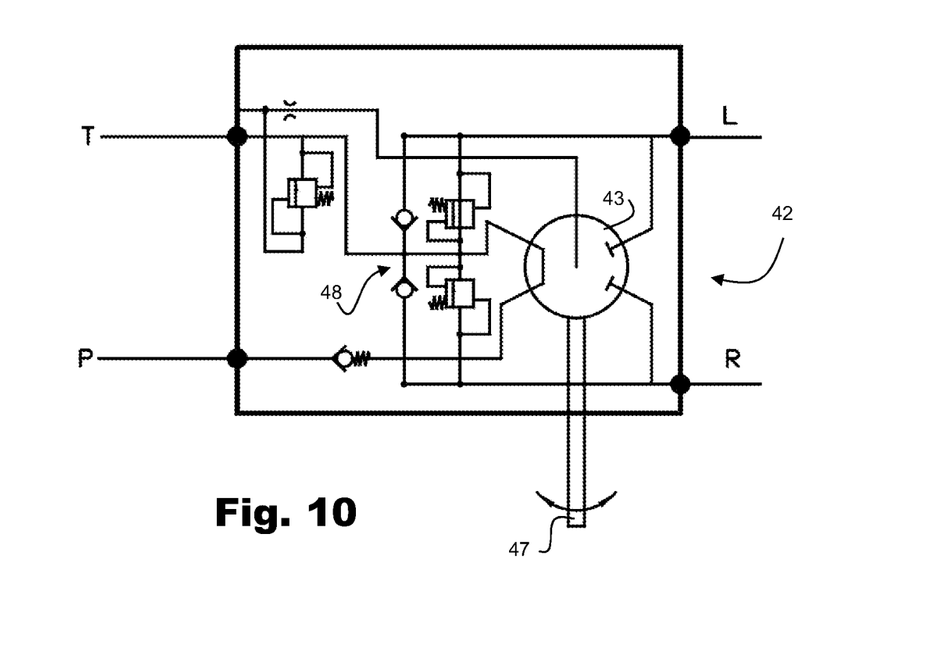
FIG. 10 is a detail of the hydraulic circuit of FIG. 9.

Referring additionally to FIG. 10, the control circuit 42 is shown in greater detail. The control circuit has ports P and AT connecting to a hydraulic pump and tank, respectively. A rotary pump 43 is controlled by a shaft 47 of a steering column so that rotation of the steering column in one direction causes hydraulic fluid to be pumped through port L into line 44 (and a corresponding volume of fluid to be returned via port R), while rotation of the column in the other direction causes the opposite flow to occur. An arrangement of one-way valves and solenoid valves handles the resulting flow of hydraulic fluid within the circuit.

When left-hand line 44 is pressurized, the piston of system 10 is driven rearwardly, withdrawing the connecting rod 22 of system 10 into the cylinder. Simultaneously, this pressurizes the rear chamber of system 10 and fluid flows through bridging line 46 into the front chamber of system 10', driving the piston of the latter system rearwardly to the same degree. Pressurizing the right-hand line 48 has the opposite effect, with fluid flows being reversed and the pistons being driven forwardly in each case.

The overall vehicle steering system for the front wheels has the same advantages on each side as the single wheel steering system of FIGS. 1-6, providing accurate steering beyond 90 degrees with no lateral forces being exerted on the seals of the hydraulic cylinders.

The invention is not limited to the embodiments described herein which may be varied within the scope of the claims that follow.

The invention claimed is:

1. A steering system for a vehicle wheel, comprising:
   a wheel carrier for mounting a steered wheel, the wheel carrier being rotatably mounted with respect to the vehicle about a steering axis to allow the wheel to be steered;
   a hydraulic cylinder having a piston therein and a rigid connecting rod assembly extending from the piston out of the cylinder;
   wherein the rigid connecting rod assembly comprises a first section adapted to reciprocate into and out of the cylinder and a second curved section rigidly extending from the first section to a pivot point connection where it is pivotally connected to the wheel carrier at an offset from the steering axis;
   wherein the curved second section is a curved member extending between the first section and the pivot point connection; and
   wherein the hydraulic cylinder is pivotally mounted on the vehicle such that it is prevented from translational movement relative to the vehicle but capable of changing its orientation with respect to the vehicle.

2. A steering system according to claim 1, wherein said first section is a straight linear rod section and said pivot point is disposed in linear alignment with the first section.

3. A steering system according to claim 2, wherein said pivot point, the point at which the second and first sections are rigidly coupled, the axis of the first section, the axis of the cylinder, and the position at which the cylinder is pivotally mounted on the vehicle, are all collinear.

4. A steering system according to claim 1, wherein the curved member defines concavity which may accommodate a portion of the wheel carrier.

5. A steering system according to claim 4, wherein the concavity accommodates a portion of the wheel carrier when the steering angle is at a maximum in one direction.

6. A steering system according to claim 4, wherein said second section is an arcuate member.

7. A steering system according to claim 1, wherein the connecting rod assembly is an integrally formed structure having said first and second sections.

8. A steering system according to claim 1, wherein the connecting rod assembly comprises a connecting rod as said first member and an extension member rigidly affixed to the connecting rod as said second member.

9. A steering system according to claim 1, further comprising a passive rod extending from the cylinder in the opposite direction to the connecting rod and mounted on a common piston or piston assembly therewith, the passive rod sealing the cylinder in the direction away from the wheel and permitting synchronization of the cylinder with another hydraulic cylinder in a push-pull arrangement.

10. A steering system according to claim 1, further comprising a wheel mounted on said wheel carrier.

11. A steering system according to claim 1, further comprising a hydraulic circuit including a hydraulic pump, a connection from the hydraulic pump to the hydraulic cylinder, and means for controlling the flow of hydraulic fluid within the hydraulic circuit in response to a steering input.

12. A vehicle steering system comprising a first steering system for a first vehicle wheel according to claim 1, a second steering system for a second vehicle wheel according to claim 1, and a hydraulic circuit connecting the hydraulic cylinders of the first and second steering systems in series.

13. A vehicle comprising a steering system according to claim 1.

* * * * *